US009621418B2

(12) United States Patent
Gibson

(10) Patent No.: US 9,621,418 B2
(45) Date of Patent: Apr. 11, 2017

(54) AUTOMATIC NETWORK NODE RELAY LINK CONFIGURATION TOOL

(71) Applicant: T-Mobile USA, Inc., Bellevue, WA (US)

(72) Inventor: Todd Gibson, Rowlett, TX (US)

(73) Assignee: T-Mobile U.S.A., Inc., Bellevue, WA (US)

(*) Notice: Subject to any disclaimer, the term of this patent is extended or adjusted under 35 U.S.C. 154(b) by 63 days.

(21) Appl. No.: 14/852,357

(22) Filed: Sep. 11, 2015

(65) Prior Publication Data
US 2017/0078140 A1 Mar. 16, 2017

(51) Int. Cl.
H04W 4/00 (2009.01)
H04L 12/24 (2006.01)
H04W 52/46 (2009.01)
H04L 25/20 (2006.01)

(52) U.S. Cl.
CPC ......... H04L 41/0806 (2013.01); H04L 25/20 (2013.01); H04L 41/12 (2013.01); H04W 52/46 (2013.01)

(58) Field of Classification Search
None
See application file for complete search history.

(56) References Cited

U.S. PATENT DOCUMENTS 9,184,825 B2 * 11/2015 Kimura ............... H04B 7/155 370/328
2010/0046418 A1 * 2/2010 Horn .................... H04W 40/22 370/315
2010/0260097 A1 * 10/2010 Ulupinar ............. H04B 7/2606 370/315
2011/0081903 A1 * 4/2011 Cai .................. H04W 36/0055 455/424
2012/0184204 A1 * 7/2012 Kazmi ............... H04B 7/15542 455/7
2012/0264368 A1 * 10/2012 Aminaka ............. H04B 7/155 455/9
2013/0090055 A1 * 4/2013 Pitakdumrongkija ... H04B 7/15 455/9
2013/0182638 A1 * 7/2013 Zhou .................... H04B 7/155 370/315

(Continued)

Primary Examiner — Anh-Vu Ly
(74) Attorney, Agent, or Firm — Han Santos, PLLC; Elliott Y. Chen

(57) ABSTRACT

The implementation of the relay configuration tool may lead to the rapid deployment of relay links between network nodes. The tool may receive identification information of a donor network node that provides backhaul access to a core network, as well as identification information of a remote network node that is to use the backhaul. The tool may further obtain node information on the donor network node and the remote network node from a node information database based on the identification information. The tool may additionally receive link specifications for a relay link to be established between the network nodes. Accordingly, the tool may determine the communication frequencies and a power level for the relay link based at least on the node information and the link specifications. The communication frequencies and the power level, along with other configuration parameters, may be used by the tool to establish the relay link.

24 Claims, 8 Drawing Sheets

(56) References Cited

U.S. PATENT DOCUMENTS

2013/0336200 A1* 12/2013 Andreozzi ........ H04W 72/1226
370/315
2013/0337811 A1* 12/2013 Faerber ............. H04W 36/0072
455/436
2014/0105135 A1* 4/2014 Tellado ................ H04L 5/0037
370/329

* cited by examiner

AUTOMATIC NETWORK NODE RELAY LINK CONFIGURATION TOOL

BACKGROUND

A wireless telecommunication carrier may deploy network nodes to multiple locations to provide continuous network coverage and communication services to customers. A network node may be linked to the core network of the wireless telecommunication carrier by a backhaul. The backhaul is a wired connection, such as a fiber optics link, that transports telecommunication and data communication traffic between the network node and the core network. However, in some instances, it may be infeasible to equip a network node with a wired backhaul to the core network as a result of geographical features, distance to the core network, or the cost of deploying a wired connection. In such instances, a wireless relay link may be established between a network node that is without a wired backhaul and a network node that is equipped with the wired backhaul to the core network. In this way, the network node with the wired backhaul may leverage the wired backhaul of the other network node to exchange telecommunication and data communication traffic with the core network.

The wireless relay link between two network nodes may be implemented with the installation of microwave communication equipment at both network nodes. The microwave equipment for a network node may include an outdoor unit (ODU) and/or an indoor unit (IDU). The ODU may be connected to a microwave antenna, and is responsible for radio frequency (RF) signal processing, the conversion of intermediate frequency (IF) signals to RF signals, and vice versa. The IDU may be responsible for performing dispatch, multiplex/demultiplex, and modulation/demodulation of communication signals. The configuration of a wireless relay link between two network nodes may be a time consuming and difficult task. For example, the configuration may involve the manual input of multiple configuration parameters into the IDUs and/or ODUs of two network nodes in order to establish the relay link between two network nodes.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
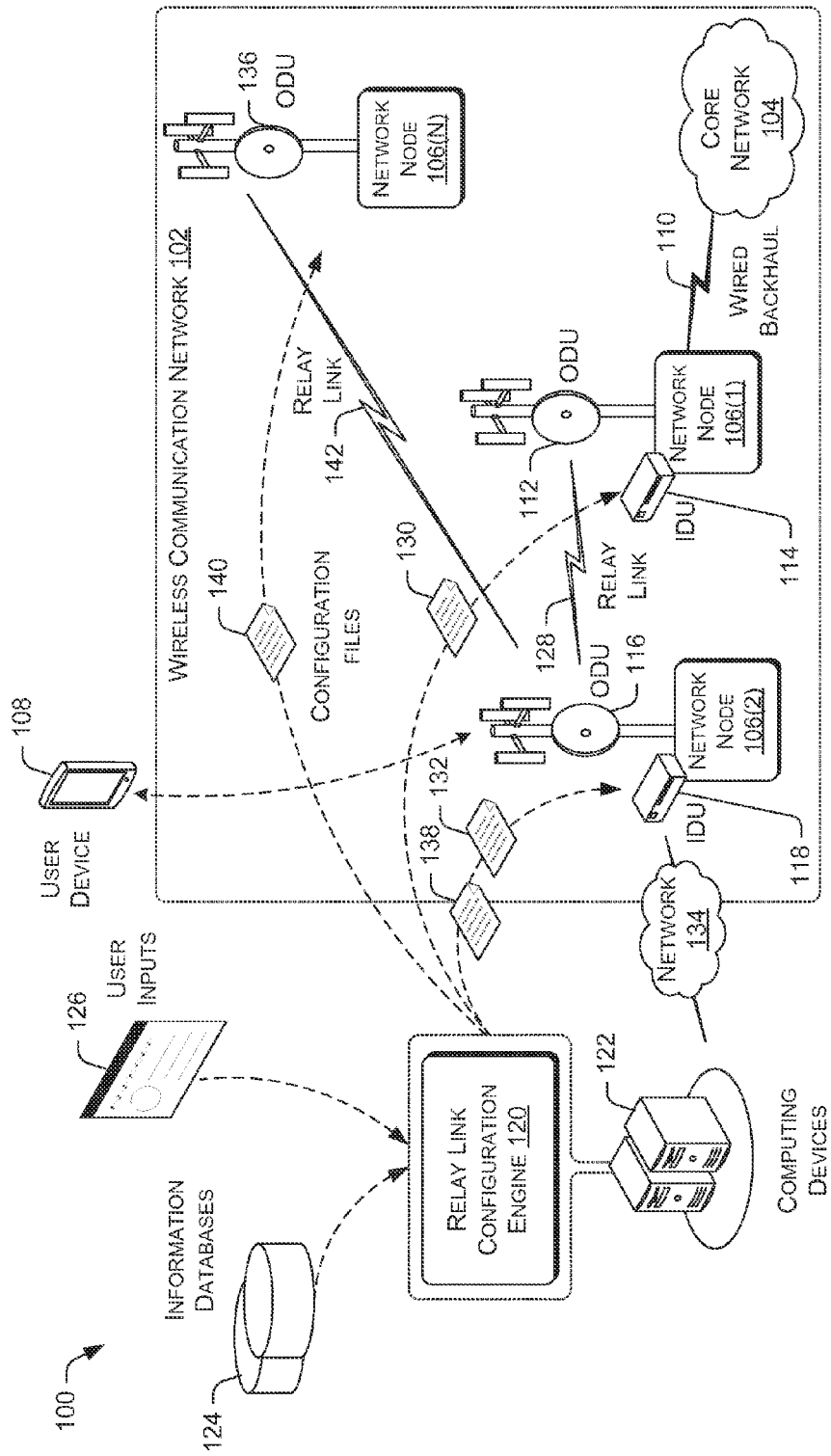
FIG. 1 illustrates an example architecture for deploying a network node relay link configuration tool.

This disclosure is directed to techniques for implementing a relay configuration tool that automatically generates configuration settings for the network nodes of a wireless telecommunication carrier. The network nodes may include a donor network node that is able to access a wired backhaul connecting to a core network of the wireless telecommunication carrier. For example, the donor network node may be a network node that is directly connected to a core network via the wired backhaul or an intermediate relaying network node that is one or more network node links away from the network node with the wired backhaul to the core network. The network nodes may further include a remote network node that lacks wired backhaul access to the core network. The configuration settings generated by the relay configuration tool may configure the wireless communication equipment of each network node to establish a relay link between the remote network node and the donor network node. Accordingly, the relay link may enable the remote network node to use the wired backhaul access of the donor network node to exchange telecommunication and data communication traffic with the core network.

In various embodiments, the relay configuration tool may automatically determine the communication frequencies and the power level of the relay link to be established. The determination may be made based on the node information of the donor network node and the remote network node, as well as the frequency information for the relay link that is to be established. In at least one embodiment, the node information may be retrieved from a node information database. The relay configuration tool may further determine the configuration settings for the donor and remote network nodes based on inputted configuration parameters for the relay link. The determined communication frequencies, power level, and configuration settings may serve as the basis for the generation of configuration files for the donor and remote network nodes by the relay configuration tool. Accordingly, the relay configuration tool may transmit the configuration files to the donor and remote network nodes. In turn, the configuration files may be implemented by the donor and remote network nodes to establish the relay link, such as a microwave communication link, between the network nodes.

The implementation and use of the relay configuration tool may automate the configuration of a relay link between a donor network node and a remote network node. The automatic determination of communication frequency and the power level for the relay link to be established, as well as the configuration settings for the network nodes that implement the relay link, may enable the configuration of the relay link in near real time. In contrast, conventional techniques for configuring a relay link between a network node and a recipient node may be a time consuming and procedurally complicated task. For example, the average time for configuring a relay link via the relay configuration tool is in the neighborhood of five minutes. In contrast, the average time for the manual configuration of a relay link between network nodes without the benefit of the relay configuration tool may be as long as nearly an hour.

Accordingly, the implementation of the relay configuration tool may lead to the rapid deployment of relay links between donor network nodes and remote network nodes. Such rapid deployment may lead to faster wireless communication network expansion to geographical locations that are previously unserved or underserved by a wireless telecommunication carrier. As such, the implementation of the relay configuration tool may help to decrease in the amount of network coverage problems that are experienced by subscribers, as well as reduce the number of calls to customer care of the wireless telecommunication carrier. The implementation of the relay configuration tool may also reduce the labor cost associated with the expansion or improvement of the wireless telecommunication network. The techniques described herein may be implemented in a number of ways. Example implementations are provided below with reference to the following figures.

Example Network Architecture

FIG. 1 illustrates an example architecture 100 for deploying a network node relay link configuration tool. The architecture 100 may include a wireless communication network 102. The wireless communication network 102 may include a core network 104, as well as multiple network nodes, such as the network nodes 106(1) and 106(2). The network nodes are responsible for handling voice and data traffic between user devices, such as a user device 108, and the core network 104. The user device 108 may be a smart phone, a feature phone, a tablet computer, or another portable communication device. The core network 104 may provide telecommunication and data communication services to the user devices. For example, the core network 104 may connect the user device 108 to other telecommunication and data communication networks (including but not limited to the Internet).

The network node 106(1) may be connected to the core network 104 via a wired backhaul 110. However, the network node 106(2) may have no wired backhaul connection with the core network 104. Each of the network nodes 106(1) and 106(2) may be equipped with wireless communication equipment for the wireless exchange of communication data between the network nodes. In some embodiments, the wireless communication equipment may be microwave communication equipment. There may be two models for the deployment of wireless communication equipment at the network nodes. In a split mount deployment model, the wireless communication equipment of a network node may include an outdoor unit (ODU) and an indoor unit (IDU). The ODU may be connected to a microwave antenna, and is responsible for radio frequency (RF) signal processing, the conversion of intermediate frequency (IF) signals to RF signals, and vice versa. The IDU may be responsible for performing dispatch, multiplex/demultiplex, and modulation/demodulation of communication signals. For example, the network node 106(1) may be equipped with an ODU 112 and an IDU 114, while the network node 106(2) may be equipped with an ODU 116 and an IDU 118. However, in an all-outdoor deployment model, a network node may have an ODU but lacks an IDU. In such a deployment model, the ODU may additionally provide the same functionalities as an IDU, and no IDU is present in the network node.

The architecture 100 may further include a relay link configuration engine 120. The relay link configuration engine 120 may execute on one or more computing devices 122. The computing devices 122 may include general purpose computers, such as desktop computers, tablet computers, laptop computers, servers, and so forth. However, in other embodiments, the computing devices 122 may include smart phones, game consoles, or other electronic devices that are capable of receiving inputs, processing the inputs, and generating output data. In various embodiments, the computing devices 122 may be operated by a wireless telecommunication carrier or a third-party entity that is working with the wireless telecommunication carrier.

The relay link configuration engine 120 may generate configuration settings for the network nodes 106(1) and 106(2). The configuration settings may be generated based on data that is received from one or more information databases 124 and user inputs 126 from a user. The user inputs 126 may include network node identification information, relay link configuration parameters, frequency information, network node configuration parameters, and/or so forth. The configuration settings may configure the wireless communication equipment of the network nodes to establish a relay link 128 between the network nodes. The relay link 128 may enable the network node 106(1) to act as a donor network node and the network node 106(2) to act as a remote network node. Accordingly, the network node 106(2) may use the wired backhaul 110 of the network node 106(1) to exchange telecommunication and data communication traffic with the core network 104.

In various embodiments, the relay link configuration engine 120 may determine the communication frequencies and the power level of the relay link 128 to be established. The determination may be made based on the node information of the network nodes 106(1) and 106(2), as well as the inputted frequency information for the relay link 128 that is to be established. In at least one embodiment, the node information may be retrieved from a node information database. The node information database may be a proprietary database that is controlled by a wireless communication carrier that operates the wireless communication network 102. The relay link configuration engine 120 may further determine the configuration settings for the network nodes 106(1) and 106(2) based on configuration parameters for the relay link. In various embodiments, the configuration parameters may include site classification information for the network nodes, link protection information for the relay link, frequency polarization information, communication slot prioritization information, port setting information, relay link identification information, wayside (in-band management) information, and/or so forth.

Subsequently, the relay link configuration engine 120 may generate configuration files for the network nodes 106(1) and 106(2) based on the determined communication frequency, power level, and configuration settings. For example, the relay link configuration engine 120 may generate the configuration file 130 for the network node 106(1), and the configuration file 132 for the network node 106(2). The configuration files 130 and 132, respectively, are then transmitted by the relay link configuration engine 120 to the network nodes 106(1) and 106(2) via a network 134. The network 134 may include a local area network (LAN), a larger network such as a wide area network (WAN), the wireless communication network 102, and/or the Internet. Upon receiving a corresponding configuration file, each of the network nodes 106(1) and 106(2) may configure its wireless communication equipment according to the settings in the configuration file. The configuration files 130 and 132 may enable the network nodes 106(1) and 106(2) to establish the relay link 128 between the nodes.

Each configuration file may provide configuration updates to a network node. In at least some embodiments, the configuration updates may be real-time configuration updates. The configuration updates may comprise command line interface (CLI) scripts, simple network management protocol (SNMP) put statements, and/or other programming inputs. The configuration updates may be implemented by an IDU or an ODU of a network node using software-defined networking (SDN) features and/or functions. For example, the real-time configuration updates may be performed via orchestration using technologies such as ConfD, Tail-f, network configuration protocol (NETCONF), and/or so forth. In an instance in which the network node is a split mount network node, the configuration file may be implemented by the IDU of the network node. However, in an instance in which the network node is an all-outdoor network node, the configuration file may be implemented by the ODU of the network node.

In alternative embodiments, the network node 106(2) may act as a relay node for another network node, such as network node 106(N), that also lack wired backhaul access to the core network 104. The network node 106(N) may be an all-outdoor network node that is equipped with an ODU 136 but lacks an IDU. In such embodiments, the relay link configuration engine 120 may generate configuration files 138 and 140 that enable the establishment of a relay link 142 between the network node 106(2) and the network node 106(N). The relay link configuration engine 120 may transmit the configuration file 138 to the network node 106(2) for implementation, and the configuration file 140 to the network node 106(N) for implementation, in order to establish the relay link 142. In this way, the network node 106(N) may use the relay link 142 and the relay link 128 to leverage the wired backhaul 110. Accordingly, the network node 106(N) may exchange telecommunication and data communication traffic with the core network 104 without a dedicated wired backhaul to the core network 104. Other alternative embodiments may enable the establishment of a relay link between two relay nodes in a similar manner, in which the relay nodes are intermediate nodes in a node chain that connects a remote network node to a donor network node.

Example Computing Device Components

Figure 2:
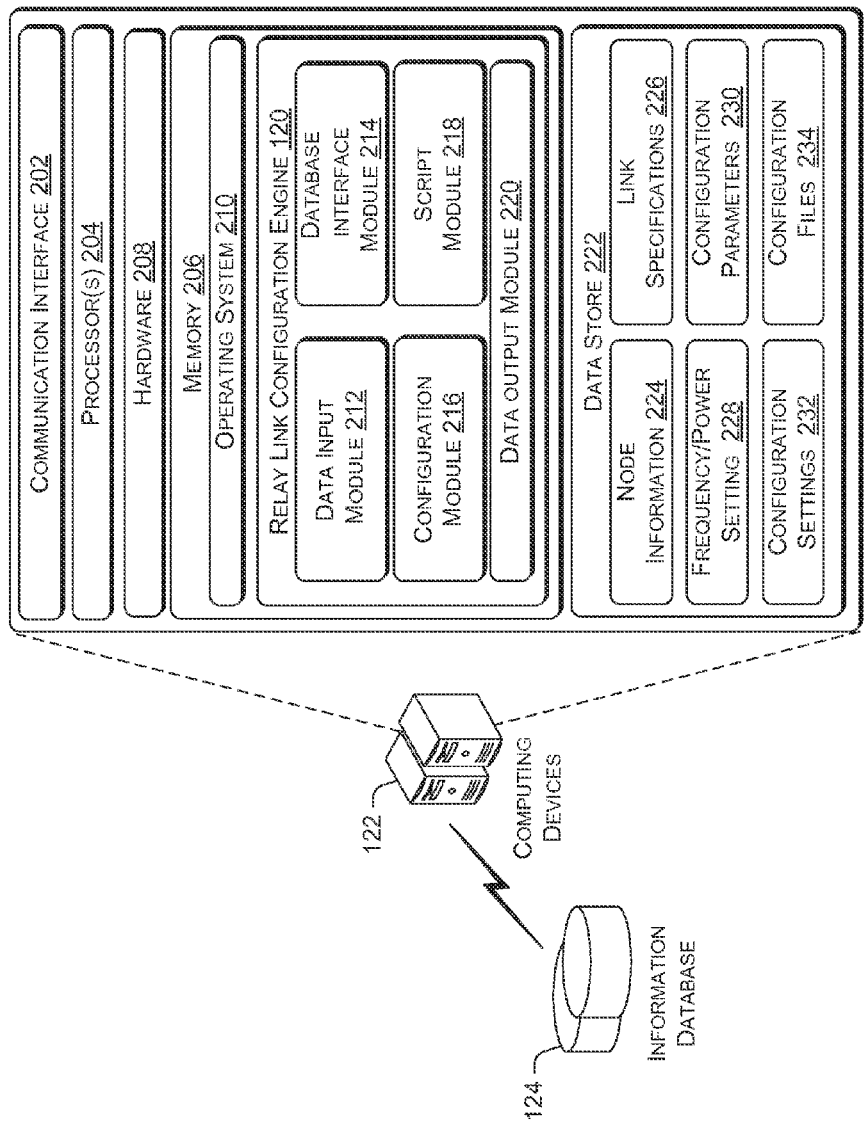
FIG. 2 is a block diagram showing various components of one or more illustrative computing devices that implement the network node relay link configuration tool.

FIG. 2 is a block diagram showing various components of one or more illustrative computing devices that implement the network node relay link configuration tool. The one or more computing devices 122 may include a communication interface 202, one or more processors 204, memory 206, and hardware 208. The communication interface 202 may include wireless and/or wired communication components that enable the computing devices to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing devices 122 may implement an operating system 210 and the relay link configuration engine 120. The operating system 210 may include components that enable the computing devices 122 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The relay link configuration engine 120 may include a data input module 212, a database interface module 214, a configuration module 216, a script module 218, and a data output module 220. The modules may include routines, program instructions, objects, and/or data structures that perform particular tasks or implement particular abstract data types. The memory 206 may also include a data store 222 that is used by the relay link configuration engine 120. In various embodiments, the relay link configuration engine 120 may be a standalone application or a web-based application.

The data input module 212 may receive data that are inputted by a user via application user interfaces. The application user interfaces may be presented via the standalone application or a web browser executing on a computing device. The data may include manually inputted information that are used to by the relay link configuration engine 120 to establish a relay link between two network nodes. For example, the data may include relay link configuration parameters, frequency information, site classification information for the network nodes, link protection information for the relay link, frequency polarization information, communication slot prioritization information, port setting information, relay link identification information, wayside (in-band management) information, and/or so forth. The two network nodes may include a donor network node and a remote network node, such as the network node 106(1) and the network node 106(2).

The database interface module 214 may interface with one or more information databases 124. The information databases 124 may include a node information database that store node information regarding each network node. The node information for a network node may include network node site information, a network node address, virtual local area network (VLAN) identifier, Internet protocol (IP) address, subnet mask, gateway IP, IDU count, site type, any other VLAN identifiers, and/or so forth. The network node site information may include identification of a cluster donor, an immediate donor, a primary VLAN port number, etc., for the network node. The IDU count may indicate the number of IDUs at the network node. The information databases 124 may further include databases that store regulatory information that govern wireless telecommunication, such as rules governing the provisions of frequencies, channels, power levels for the establishment of relay links between network nodes.

The configuration module 216 may use algorithms to analyze the relevant user inputs 126 and the data obtained from the information databases 124 in order to generate configurations for the relay links. The algorithms may include logical statements, data arrays, lookup tables, validation routines, and/or other application code. In various embodiments, the algorithms may enable the configuration module 216 to determine communication frequencies and a power level for a relay link based on node information retrieved from a node information database and link specifications that are inputted by a user. The configuration module 216 may further use the algorithms to determine the configuration settings for a pair of network nodes that establish the relay link based on configuration parameters that are inputted by the user.

In various embodiments, the inputted configuration parameters may include site classification information for the network nodes, link protection information for the relay link, frequency polarization information, communication slot prioritization information, port setting information, relay link identification information, wayside (in-band management) information, and/or so forth. Accordingly, the configuration module 216 may use such information to populate RF specifications, enable and or disable Ethernet ports, select IP addresses, as well as determine other configuration settings for the network nodes that are involved in the establishment of the relay link. The configuration module 216 may use the data input module 212 and the database interface module 214 to query and receive the appropriate data at each stage of analysis.

Accordingly, the configuration module 216 may generate configurations for a remote network node and a donor node that is directly connected by a wired backhaul to the core network. In other embodiments, the configuration module 216 may generate configurations for one or more intermediate devices, such as intermediate network node or intermediate routers, in order to automate the implementation of a node chain that provide an end-to-end communication path for a remote network and the core network. In such embodiments, the configuration module 216 may generate updates to routing tables, VLAN databases, ports, and/or so forth. The port updates may include updates to port speed, port duplexing settings, port auto-negotiation settings, port descriptions, and/or so forth.

The script module 218 may generate configuration files for the implementation of a relay links between network nodes based on configurations provided by the configuration module 216. A configuration file for a network node may include frequency and power link settings of a relay link to be established, configuration settings for the network node, and/or other relay link-related settings that are generated by the configuration module 216. Each configuration file may provide configuration updates to a network node. In at least some embodiments, the configuration updates may be real-time configuration updates. The configuration updates may comprise CLI scripts, SNMP put statements, and/or other programming inputs. The configuration updates may be implemented by an IDU or an ODU of network node using SDN features and/or functions. For example, the real-time configuration updates may be performed via orchestration using technologies such as ConfD, Tail-f, NETCONF, and/ or so forth. Accordingly, the configuration files may be processed by the IDUs or ODUs of the network nodes to implement the relay links. For example, an application program interface (API) provided by a command execution application of an IDU may be called by the script module 218 to receive a configuration file and implement the configuration updates that are in the configuration file.

The data output module 220 may generate the various application user interfaces that are configured to receive data inputs and display information to a user. The application user interfaces may include interfaces that request identification information of network nodes, link specifications of relay links to be established, configuration parameters of the network nodes that are involved in the establishment of relay links, and/or so forth. The application user interfaces may also include user interfaces that present information retrieved from the information databases 124, verification dialogue boxes, relay link configuration results, configuration error messages, help information, configuration file management menus, and/or so forth. The configuration file management menus may enable a user to create, save, modify, and delete configuration files, as well as transmit the configuration files to the various network nodes for implementation.

The data store 222 may store data that are processed or generated by the relay link configuration engine 120. The data store 222 may include one or more databases, such as relational databases, object databases, object-relational databases, and/or key-value databases that store data. For example, data stored in the data store 222 may include node information 224, link specifications 226, frequency and power settings 228, configuration parameters 230, configuration settings 232, configuration files 234, and/or other information. Additional details regarding the functionalities of the modules in the relay link configuration engine 120 are discussed in view of FIGS. 3-8. Further, the relay link configuration engine 120 may include other modules that perform the functionalities described in the context of these figures.

Example User Interfaces

FIGS. 3-6 illustrate user interfaces that may be presented by the relay link configuration engine 120 for the implementation of a relay link between two network nodes. For the purpose of this illustration, the implementation of the relay link is discussed in the context of wireless communication equipment that are manufactured by Ceragon Networks, Ltd. of Tel Aviv, Israel. Such wireless equipment may include the FibeAir IP-10 series of high capacity wireless backhaul equipment. However, the relay link configuration engine 120 may provide similar user interface for the configuration of other types of wireless backhaul equipment, including ODUs and/or IDUs, as manufactured by Ceragon Networks Ltd., as well as manufactured by other companies.

Figure 3:
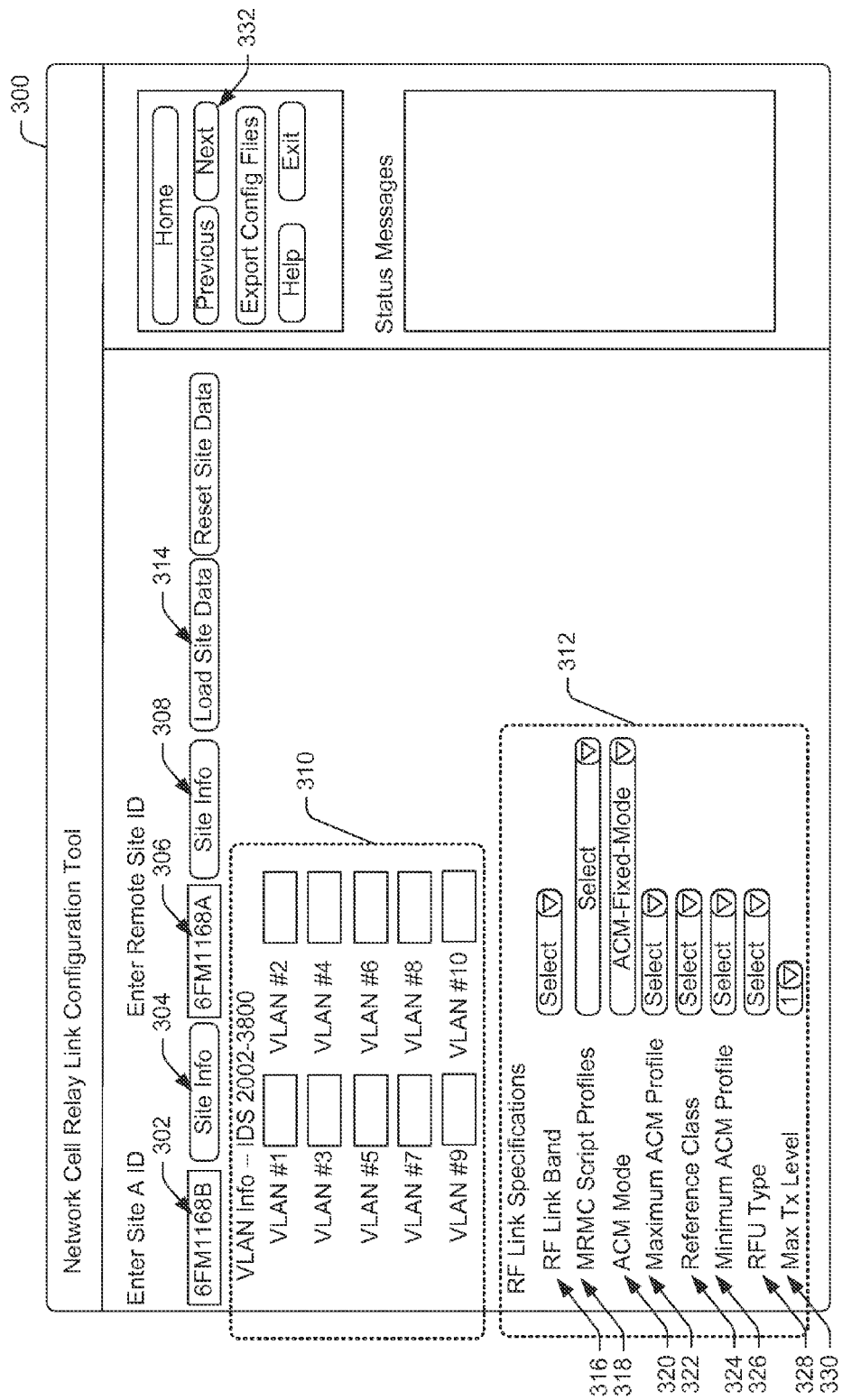
FIG. 3 is an illustrative user interface presented by a network node relay link configuration tool for obtaining information on network nodes that are involved in the establishment of a relay link.

FIG. 3 is an illustrative user interface 300 presented by a network node relay link configuration tool for obtaining information on network nodes that are involved in the establishment of a relay link. The user interface 300 may include a "Site A ID" field 302 and a "Site Info" button 304. A user may enter a network node identifier of a network node that is closest to the core network (104) hub site, also may be known as an alternative access vendor hub site, into "Site A ID" field 302. In various embodiments, the AAV hub site may be a network node that has a dedicated wired backhaul that connects to the core network 104 of the wireless communication network 102. The user interface 300 may further include a "Remote Site ID" field 306 and a 'Site Info" button 308. A user may enter a network node identifier of a network node that is the remote network node into the "Remote Site ID" field 306. The user interface 300 may further include a VLAN information section 310 and a RF link specifications section 312.

Upon entry of a network node identifier in the "Site A ID" field 302, the user may select the "Site Info" button 304 to cause the configuration module 216 to validate the identifier, as well as retrieve node information associated with the identifier from a node information database. Accordingly, the configuration module 216 may generate the illustrative dialogue box 402 shown in FIG. 4.

Figure 4:
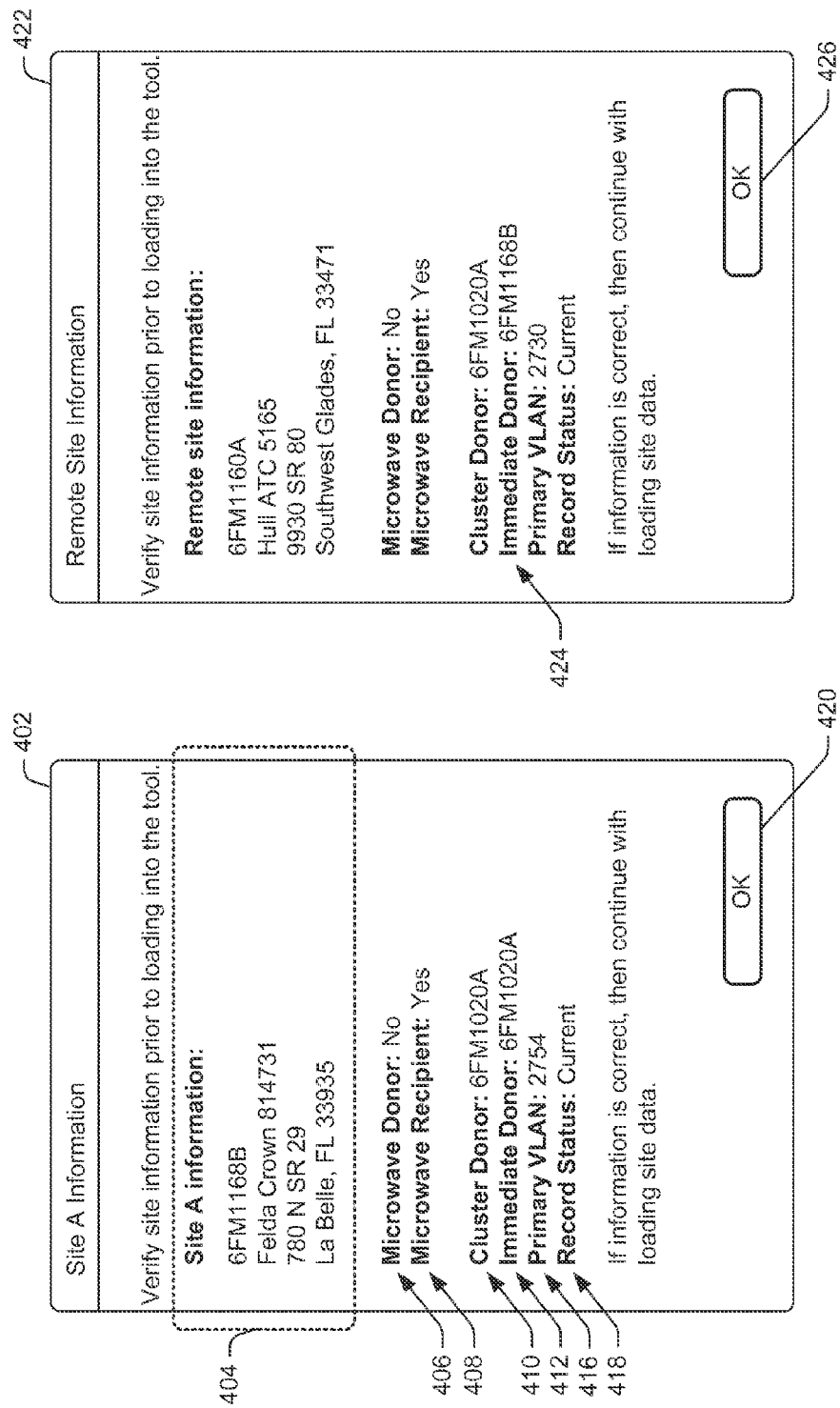
FIG. 4 is an illustrative dialogue box presented by a network node relay link configuration tool for confirming the identification information that are obtained for a network node involved in the establishment of a relay link.

As shown in FIG. 4, the illustrative dialogue box 402 may include Site A information 404, microwave donor information 406, the microwave recipient information 408, cluster donor information 410, immediate donor information 412, primary VLAN information 414, and a record status 416. The site A information 404 may show a street address at which the network node is located. The microwave donor information 406 may indicate whether the network node is a donor network node. In various embodiments, only AAV hub sites may be set as donor network nodes. The cluster donor information 410 may indicate the AAV hub site identifier for a network node cluster that includes the network node having the identifier entered in the "Site A ID" field 302.

The immediate donor information 412 may indicate the immediate upstream donor network node for the network node having the identifier entered in the "Site A ID" field 302. For example, as shown in the dialogue box 402, the network node "6FM1020A" may be the cluster donor as well as the immediate donor, which means that the network node "6FM1168B" is one hop away from an AAV hub site. The primary VLAN information 414 may indicate the primary access VLAN for the network node having the identifier entered in the "Site A ID" field 302. This information may be populated into the VLAN information section 310 of the user interface 300.

The record status 416 may indicate a status of the information as retrieved from node information database and displayed in the dialogue box 402. For example, the statuses of the information may include "Current," "Proposed Complete", "Proposed Incomplete," these statuses may indicate that the retrieved information is ready for use by the relay link configuration engine 120. However, a status of "Historical" may indicate that the retrieved information is outdated and unsuitable for use by the relay link configuration engine 120. The user may use the acknowledgment button 420 to acknowledge the validation and dismiss the dialogue box 402.

Returning to FIG. 3, upon entry of a network node identifier in the "Remote Site ID" field 306, the user may select the "Site Info" button 308 to cause the configuration module 216 to validate the identifier, as well as retrieve node information associated with the identifier from a node information database. Accordingly, the configuration module 216 may generate the illustrative dialogue box 422 shown in FIG. 4.

Once again, as shown in FIG. 4, the illustrative dialogue box 422 may present information for the recipient donor network node in a similar manner as described with respect to the dialogue box 402. However, the immediate donor information 424 indicates a network node identifier that is identical to the identifier of the network node shown in the site A information 404 of the dialogue box 402. For example, as shown in the dialogue box 422, the immediate donor is "6FM1168B," which matches the information that is shown in the site A information 404. The user may use the acknowledgment button 426 to acknowledge the validation and dismiss the dialogue box 422.

Returning to FIG. 3, following the validation of the identifiers of the two network nodes that are entered into the "Site A ID" field 302 and the "Remote Site ID" field 306, respectively, the user may activate the load site data button 314 of the user interface 300. In response, the configuration module 216 may query the node information database in order to perform a multitude of functions. The functions may include confirming that the two network nodes are directly connected while identifying the network node types of network node, such as AAV hub, relay node, recipient node, and/or so forth. The number of IDUs installed at each network node, as well as the number of existing relay links that are sourced or terminated at each network node may be determined. The functions may further include the identification of VLANs for the "Site A" network node and all downstream network nodes. For example, the primary access VLAN identifiers may be automatically populated into the VLAN information section 310 of the user interface 300. Further, in some instances, algorithms may be used to identify additional VLANs to be created automatically by the configuration module 216 when the configurations are exported to fulfill the relay link design criteria of a wireless communication carrier. However, in additional instances, VLANs with other port assignment values may be created automatically by the configuration module 216 to fulfill the relay link design criteria of other wireless communication carriers.

Additionally, the local access VLANs for each of the two network nodes may be identified. In at least one instance, the identified local access VLANs may be tailored to meet the relay link design criteria of a wireless communication carrier. In one example, the identified local access VLANs may be assigned to specific port, such as port 3, of the IDUs of the two network nodes. In other examples, the identified local access VLANs may be assigned to other ports of the IDUs of the two network nodes, such as port 4. Accordingly, the network node IDUs IPs, subnet mask, gateway IPs, IDU counts, node type, VLAN identifiers, as well as other data, may be auto-populated into the individual IDU user interfaces, such as the IDU user interfaces illustrated in FIGS. 5 and 6.

In one illustrative example, the functions performed by the configuration module 216 may generate the following commands:
  a. adding in all VLANs into the IDUs:
     cd/interfaces/ethernet/bridge
     vlan <WXYZ> add
     vlan <XYZ> add
  b. remove all VLANs from all Ethernet ports:
     set-allowed-vlans remove <WXYZ>
     set-allowed-vlans remove <XYZ>
  c. adding appropriate VLANs to the clodu service router (CSR) facing interface port 3:
     cd/interfaces/ethernet/bridge/eth-port[3]
     set-allowed-vlans add <WXYZ>
     set-allowed-vlans add <XYZ>
  d. add system location and link information (some information may be updated later):
     cd/platform/
     set system-name <SITE_ID NODAL IDENTIFIER>
     set slot-label <SITE A ID-REMOTE SITE ID_NODE NAME>
     set system-location <SITE ID>
  e. add system trap information (some information may be updated later and each radio may have unique values):

```
cd/management/mng-protocols/snmp/
set trap-clli[1]<SITE_ID NODE NAME>
set trap-clli[2]<SITE_ID NODE NAME>
```
f. add system location and link information (some information may be updated later and the information may vary based upon if network node has nodal enclosures):
```
cd/platform/
set system-name <SITE ID NODAL IDENTIFIER>
set slot-label <SITE A ID-REMOTE SITE ID NODE NAME>
set system-location <SITE ID>
```

The RF link specifications section 312 may include controls for specifying the configuration parameters for the relay link between the two network nodes identified in the "Site A ID" field 302 and the "Remote Site ID" field 306. In various embodiments, the RF link specifications section 312 may include a RF link band control 316, a multi-rate multi-channel (MRMC) script profile control 318, an adaptive coding and modulation (ACM) mode control 320, a maximum ACM profile control 322, a reference class control 324, a minimum ACM profile 326, a radio frequency unit (RFU) type control 328, and a maximum transmission level control 330. As shown, the controls may be in the form of dropdown boxes. However, the controls may be implemented using alternative forms in other embodiments, such as via radio buttons, checkboxes, etc.

The RF link band control 316 may include options such as 6 GHz, 11 GHz, 18 GHz and 23 GHz, and/or so forth. Typically, the further the distance between the IDUs of the two network nodes, the lower the frequency band that is employed. For example, a 30-miles separation between two IDUs may correlate with frequency band deployment in the 6 GHz range, whereas a one-mile separation may correlate with frequency band deployment in the 23 GHz range.

The MRMC script profile control 318 may enable the selection of predetermined RF design options that specify the allocation of transmission rates and transmission channels for the relay link. In at least one embodiment, the profiles may include profiles for performing adaptive modulation. Accordingly, if an ACM profile is selected, the ACM mode control 320 may become available for use. The RFU type control 328 may be used to select the RF unit type. For example, RFU-C may be selected for typical microwave deployments, while RFU-HP may be selected for longer range microwave deployments that use higher powers to establish relay links. The maximum transmission level control 330 may be used to control the maximum transmission power level for the relay link between the two network nodes. In various embodiments, the maximum transmission power level may be changed to suit the frequency band of the relay link, the quadrature amplitude modulation (QAM) type of the relay link, the RFU type, and/or other factors.

The ACM mode control 320 may be used to select either "acm-fixed-mode" or "acm-adaptive-mode". If the "adaptive" mode is selected, the reference class control 324, the minimum ACM profile 326, and the maximum transmission level control 330 may become available for use. In various embodiments, the reference class control 324, the minimum ACM profile 326, and the maximum transmission level control 330 may enable settings to be designated per the RF design chosen via the MRMC script profile control 318. Subsequently, assuming all information is entered correctly, the user may activate the next button 332.

The configuration module 216 may perform various functions based on the configuration parameters inputted via the RF link specifications section 312 of the user interface 300. In some embodiments, the transmit frequency and the receive frequency on the user interface 500 shown in FIG. 5 may be dynamically updated based on the configuration parameters. In such embodiments, the configuration module 216 may build an array of paired transmit and receive frequencies based on a RF link band and a MRMC script file that are selected. The transmit frequencies and the receive frequencies may be paired together according to Federal Communications Commission (FCC) rules. Accordingly, when a user selects a transmit frequency on the user interface 500, the receive frequency may be automatically populated based on the array. Further, the configuration module 216 may use an algorithm to defined the available maximum transmit powers that are available for a user to select based on the RF band, ODU type, and the modulations for the relay link. The algorithm may include if/then statements that match particular power settings to particular parameters. For instance, the maximum transmit power for a 6 GHz relay link using a HP ODU at 16 QAM may be different than a 23 GHz link using RFU-C at 256 QAM. Additionally, the radios of the two network nodes may be automatically configure for media access control (MAC) header compression. Thus, the following example RF radio settings may be configured by the configuration module 216:

```
/radio/mrmc/change-script-cmd <ACM PROFILE-LINK CAPACITY-RF CHANNEL SIZE-ADAPTIVE MODE-MAXIMUM PROFILE-ADAPTIVE POWER-REFERENCE CLASS-MINIMUM PROFILE>
cd/radio/rfu
set tx-freq <TRANSMIT FREQUENCY>
set rx-freq <RECEIVE FREQUENCY>
set max-tx-level <TRANSMIT POWER OUTPUT>
cd/radio/framer
set link-id<LINK PASSWORD>
cd/radio
set mhc-admin enable
```

Additionally, the configuration module 216 may present the user interface 500 following the configuration of the RF radio settings.

Figure 5:
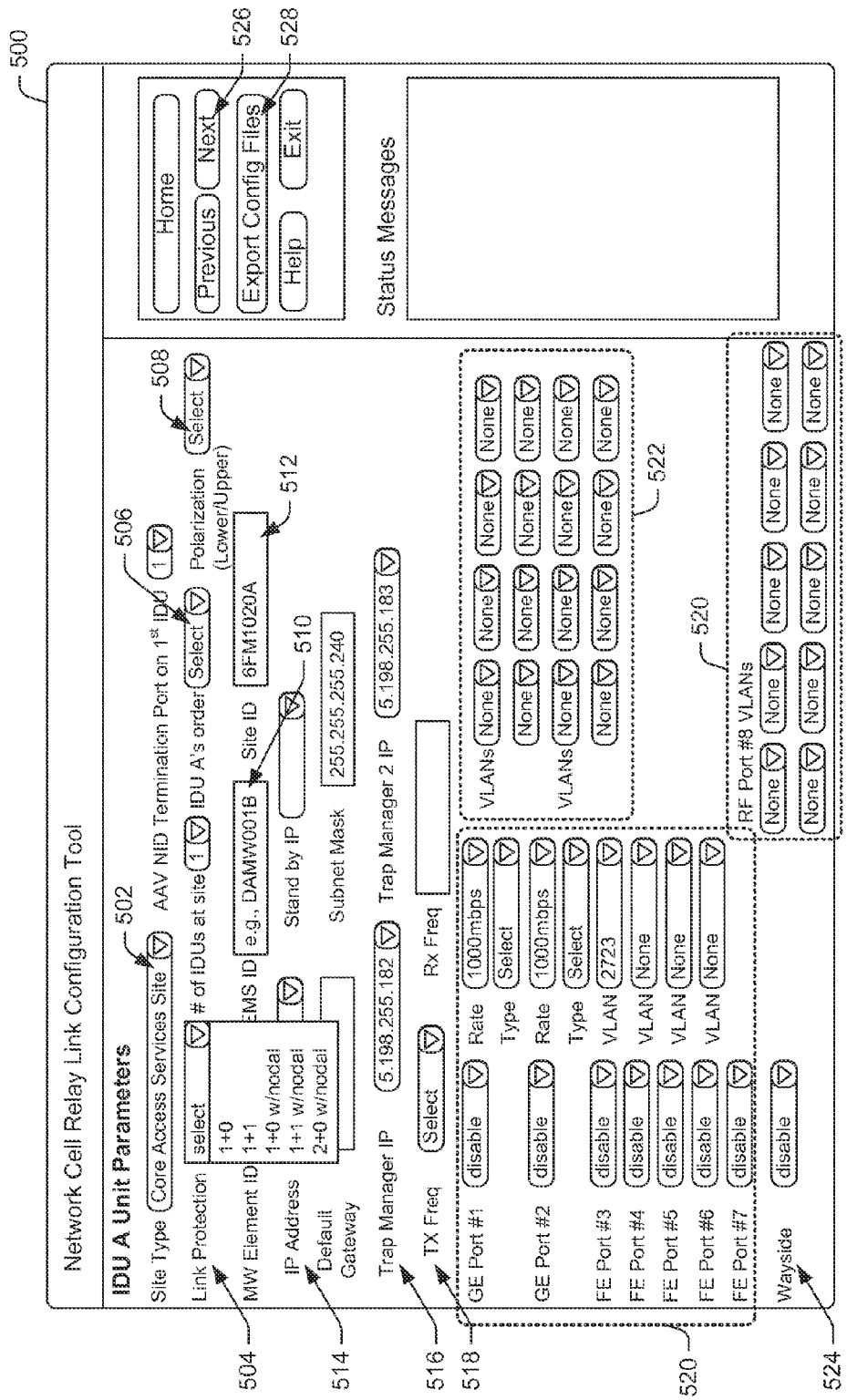
FIG. 5 is an illustrative user interface presented by a network node relay link configuration tool for configuring parameters for an indoor unit (IDU) of a network node that is closest to an alternative access vendor (AAV) hub site.

FIG. 5 is an illustrative user interface 500 presented by a network node relay link configuration tool for configuring parameters for a IDU at a network node that is closest to an AAV hub site. The IDU at the network node that is closest to the AAV hub site may be referred to as "IDU A". In various instances, the network node that is equipped with the IDU A may be a donor network node. The user interface 500 may include a site type control 502, a link protection control 504, an IDU order control 506, a polarization control 508, an element ID field 510, a site ID field 512, an IP address control 514, trap manager controls 516, a transmit frequency control 518, port type controls 520, a port assignment control 522, and a wayside control 524. In the context of the user interface 500, controls in the form of dropdown menus may be substituted with other functionally equivalent controls in other embodiments.

The configuration module 216 may determine the site type via a query to node information database and pre-populate the site type control 502. Accordingly, the site type control 502 may be greyed out since the control selection may be sourced from an analysis of the node information database. In one example, the site types may include the following:

i. core access service site —a site router will be installed at the network node;

ii. core site —no site router or cell service will be installed at the network node;

iii. relay service site—a site router will be installed at the network;

iv. relay site —no site router or cell service will be installed at this network node.

If the site type is "core site", the user may select an AAV network interface device (NID) termination port on an initial IDU. Regardless of whether such an IDU is the first or the last IDU being installed at the network node, the user may select which port the AAV is terminated into on the initial IDU. Such information may asset the configuration module 216 to determine which ports are to be enabled on the new IDU for this network node.

For the link protection control 504, the user may select the type of link that the network nodes will employ to interconnect. Link protection refers to providing a radio link with redundancy, such that the failure of one radio component does not cause the failure of the radio link. The "1+1" and "2+0" options may call for multiple IDU IPs to be assigned via the node information database. For example, the "1+1" option refers to a radio configuration in which each IDU involved in a relay link has two separate modems, and each modem is connected to its own independent ODU. In other words, the relay link actually uses two sub-links in a single radio spectrum which one link is considered active and the second link is in standby mode. The "2+0" option refers to a similar configuration in which both of the two sub-links are active. If there is an insufficient number of IDU IPs in the node information database, then the configuration module 216 may prevent the user from setting the link protection for the network node. If the user selects "2+0" for the link protection, the configuration module 216 may automatically pre-check the remote network node to confirm that a sufficient number of IDU IPs are available in node information database. If there is an insufficient number of IDU IPs, the user may be prompted to update the node information database so that additional IDU IPs are assigned.

In at least one scenario, the link protection options may include: (1) 1+0; (2) 1+1; (3) 1+0 with nodal; (4) 1+1 with nodal; and (5) 2+0 with nodal, in which "1+0" is an option for no link redundancy/link protection. However, the link protection options may include any option up to an "8+0" link in other embodiments. For example, the relay link may further include a "2+2" link, a "4+0" link, "4+4" link, or a "8+0" link with or without a nodal The "with nodal" refers to a configuration in which the multiple radios of a network cell are interconnected with a backplane link. For example, a nodal may be an enclosure that is equipped with a backplane, such that the radios are interconnected by the backplane when they are mounted into the enclosure. In another example, the nodal that provides the backplane link between the radios may be pre-built into a modular chassis that houses the radios.

Accordingly, the link protection control 504 may be used to determine the type of RF link between two network nodes. Such a determination by the configuration module 216 may also automatically update the link protection for a remote IDU, such as an IDU at the remote network node. For instance, a "2+0" link on IDU A will remove all link protection menu options except for "2+0" while a "1+x" type link on the IDU A may remove the "2+0" option at the remote IDU.

In various embodiments, the configuration module 216 may automatically determine the number of IDUs at a network using the node information database. Further, the configuration module 216 may also identify the number of IDU IPs assigned in the node information database. The IDU order control 506 may enable a user to select the placement of a new IDU into the site. For nodal installations, "1+1" and "2+0" installations may be restricted to slots 1 and 2, 3 and 4, or 5 and 6, with the constraint that the lower IDU slot is to be an odd number. Once these controls are configured, the ports 1-7 may be enabled and disabled automatically by the configuration module 216.

The polarization control 508 may be used for 2+0 links, in which the polarizations are listed by lower/upper IDU slot placements. For example, a 2+0 link using "H/V" equates to a non-XPIC link, with the lower slotted IDU using horizontal polarization and the upper slotted IDU using vertical polarization. Since the link is non-XPIC, each IDU/ODU pair may have its own separate transmit and receive frequency configurations. The element ID field 510 may enable the input of a microwave element ID for the network node. For example, the element ID may include eight characters with the characters "MW." The configuration module 216 may automatically populate the site ID information into the site ID field 512.

The IP address control 514 may enable the user to select an IP address via a drop down menu. Further, the default gateway and subnet mask information may be pre-populated by the configuration module 216. However, for IDUs in nodal slots 3-6, the IP fields (e.g., IP address, subnet, gateway, etc.) may be greyed out because no IP configurations are required for these slots. The trap manager controls 516 may enable the user to modify the order of the trap managers.

The transmit frequency control 518 may enable a user to select a suitable transmit frequency, which may be a high value or a low value. In turn, the corresponding receive frequency may be dynamically updated to match the frequency pair. Accordingly, the transmit frequency and receive frequency drop down menus may be pre-populated with RF link specific data from the RF link specifications section 312. As such, the user is not permitted to independently modify the receive frequency. In order to change the receive frequency, the user may change the transmit frequency via the transmit frequency control 518.

The port type controls 520 may enable the specification of port type on ports 1 and 2, which may be either optical or electrical, such as a RJ45 port. For distributed antenna system (DAS) network nodes, the user may manually enable the ports based on network node design, despite the fact that by default all of the interfaces are disabled. The port assignment control 522 may enable the setting of ports based on relay link design. For example, ports 1, 2, and 8 are essentially VLAN trunked ports. In most cases, the user may configure more than one VLAN to those ports if the ports are enabled. For the port connecting to a router, the user may configure one drop down VLAN for this port. For ports 1, 2 and 8, there may be multiple drop down options that correlate to the VLAN options in the VLAN information section 310. Accordingly, the configuration module 216 may automatically determine the Ethernet ports that are enabled for modification by the user and the ports that are disabled, thus preventing improper modification or use in the field. The wayside control 524 may be configured according to the type of IDU connection at the remote network node. For example, if the IDU connects to a relay only IDU (i.e., no cellular or router at the remote network node), the user may change the wayside control 524 to enabled.

Accordingly, the configuration module 216 may perform the following example tasks based on the parameters inputted at the user interface 500 of the relay link configuration engine 120. For instance, for all "1+1" and "2+0" type links, the configuration module 216 may create IDU configuration settings for the individual network nodes associated with the relay link. The configuration settings may include the information below as well as information to synchronize each pair of IDUs into a protected link pair. An example for a "2+0" link in a nodal enclosure may be as follows:

```
cd/platform/mate-idu/
set protection-admin 2+0-hsb
cd/platform/shelf-manager/
logon-unit 2
cd/platform/mate-idu/
set protection-admin 2+0-hsb
cd/platform/mate-idu/
copy-to-mate-cmd
```

For a "2+0" link, if cross-polarization interference cancellation (XPIC) is used, then the configuration module 216 may implement a XPIC MRMC script to inform the radios of the network nodes of the XPIC usage. Accordingly, the updated MRMC script may be the following:

/radio/mrmc/change-script-cmd XPIC <ACM PROFILE-LINK CAPACITY-RF CHANNEL SIZE-ADAPTIVE MODE-MAXIMUM PROFILE-ADAPTIVE POWER-REFERENCE CLASS-MINIMUM PROFILE>

The configuration module 216 may configure each individual port with the required VLAN, Ethernet, and QoS settings. For example, with respect to Ceragon IP-10s that have T1 time-division multiplexing (TDM) ports, the configuration module 216 may disable all T1 ports. Further, if a wayside channel is enabled, the configuration module 216 may automatically enable Ethernet ports 4 and 5 configured the ports for the wayside cross-connect. The configuration module 216 may automatically determine the number of management ports for the implementation of the relay link. Additionally, the network time protocol (NTP) Server IP address may be determined automatically by a SQL query depending upon odd or even site VLANs. In one example, the determination may be made by performing an initial parsing, performing a mathematical calculation with respect to the VLANs, and parsing additional information to get the actual NTP Server IP address as follows:

"Select (SELECT CASE WHEN ([Primary_vlan] % 2)< >0 THEN '51.'+(CAST((PARSENAME([default_gateway_CSR_IP],3)–128) AS varchar(10)))+ '0.255.1' ELSE '51.'+(CAST((PARSENAME([default_gateway_CSR_IP],3)–128) AS varchar(10)))+ '0.255.2' END) AS NTPaddress FROM [S_DATA]. [dbo].[vw_S_DATA_MICROWAVE_DATA] WHERE Sites_in_cluster="+siteIDquery"

wherein S_DATA is a reference to the node information database. Thus, the configuration module 216 may create the following example configuration settings in the form of CLI commands:

```
set/management/networking/ip-address/ip-address <IP ADDRESS>
cd/management/networking/ip-address/
set subnet-mask <SUBNET MASK>
set default-gateway <GATEWAY ADDRESS>
cd/management/networking/
set number-of-ports <NUMBER OF MANAGEMENT PORTS>
cd/management/mng-protocols/snmp/
set version v2c
set trap-admin[1] enable
set trap-manager[1]<TRAP MANAGER #1 IP ADDRESS>
set trap-heartbeat[1] 0
set trap-clli[1]<SITE ID NODE NAME>
set trap-community[1] PolyviewTraps01
set trap-admin[2] enable
set trap-manager[2]<TRAP MANAGER #2 IP ADDRESS>
set trap-heartbeat[2] 0
set trap-clli[2]<SITE ID NODE NAME>
set trap-community[2] PolyviewTraps02
cd/management/mng-services/time-service/ntp
set admin enable
set server 51.54.255.1
cd/interfaces/ethernet/bridge/eth-port[<PORT NUMBER>]
set connector-type <CONNECTOR TYPE>
set admin <PORT STATUS>
set auto-negotiation <OFF/ON>
set interface-alias <INTERFACE DESCRIPTION>
set-allowed-vlans remove <REMOVE ALL UNNECESSARY VLANS IDS>
set-allowed-vlans add <ADD ALL NECESSARY VLAN IDS>
set qos-classify-initial vlan-pbits
set qos-classify-default 1st
set qos-scheduling-scheme all-queues-strict
cd/interfaces/pdh/port-group/disable-all-ports
cd/interfaces/pdh/trails/del-all-trails
cd/interfaces/wayside/set
admin <DISABLE/ENABLE>
set capacity wide
```

Subsequently, for a relay link deployment that is a microwave deployment, the user may activate the next button 526. However, if the deployment is a DAS deployment, the user may activate the export file button 528. Following the activation of the export file button 528, the script module 218 may generate a configuration file that encapsulates the configuration settings for each IDU at a network node that is closest to an AAV hub site.

Figure 6:
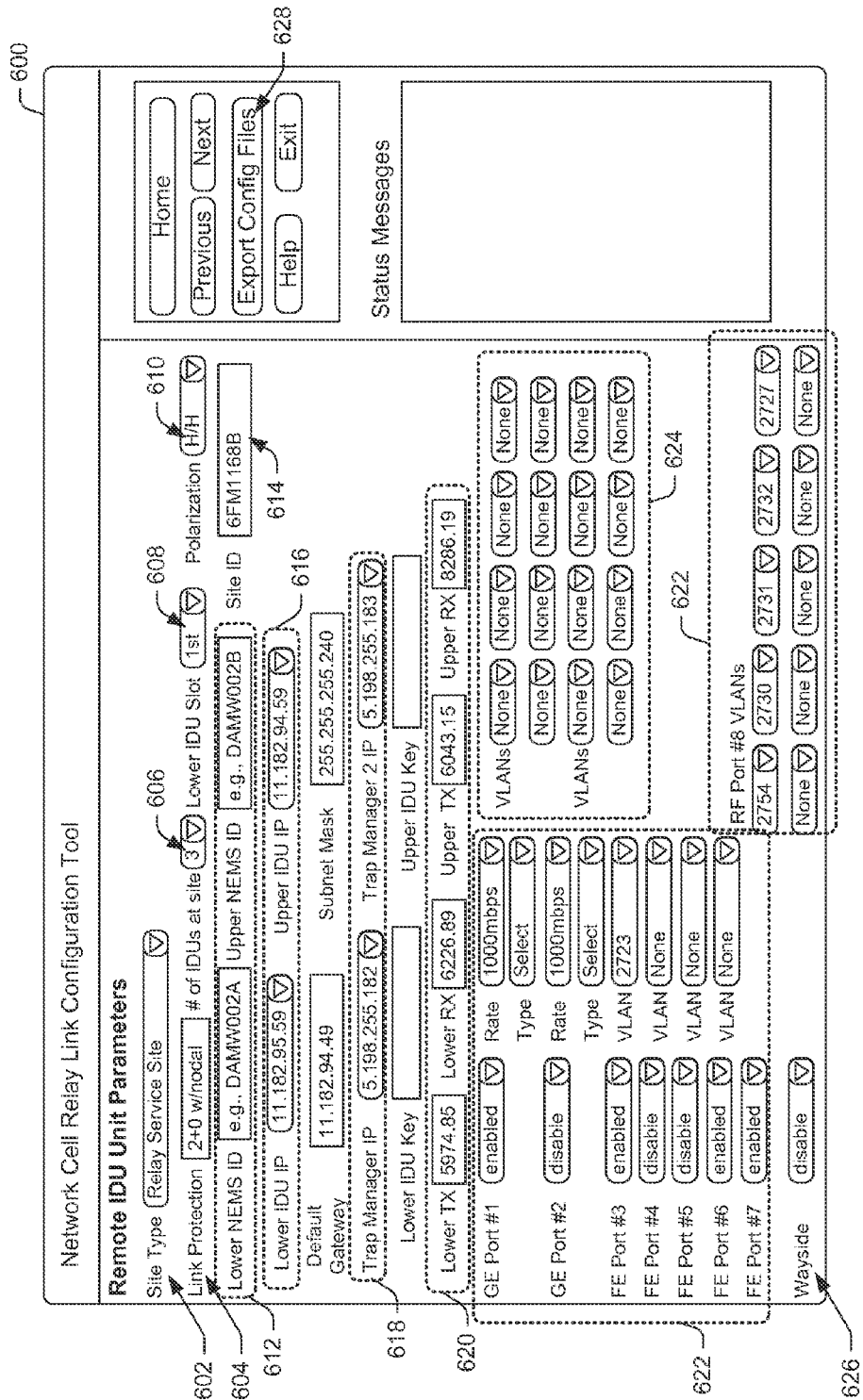
FIG. 6 is an illustrative user interface presented by a network node relay link configuration tool for configuring an indoor unit (IDU) of a remote network node to establish a relay link.

FIG. 6 is an illustrative user interface 600 presented by a network node relay link configuration tool for configuring an indoor unit (IDU) of a remote network node to establish a relay link. The configuration module 216 of the relay link configuration engine 120 may present the user interface 600. In various embodiments, the user interface 600 may be presented in response to the activation of the next button 526. The user interface 600 may be used to configure a remote network node, such as a remote network node that is to benefit from the establishment of a relay link with a network node that is closest to an Alternative Access Vendor (AAV) hub site. In the context of the user interface 600, controls in the form of dropdown menus may be substituted with other functionally equivalent controls in other embodiments.

The user interface 600 may include a site type control 602, a link protection control 604, an IDU number field 606, an IDU order control 608, a polarization control 610, an element ID control 612, a site ID field 614, an IP address control 616, the trap manger control 618, frequency fields 620, the port type controls 622, the port assignment control 624, and the wayside control 626. The site type control 602 may enable a user to select the site type of the remote network node. In one example, the site types may include the following:

i. recipient site —a site router will be installed at site
ii. relay service site —a site router will be installed at site
iii. relay site —no site router or cell service will be installed at this site
iv. DAS site —a high density site with multiple separate sites local to the IDU.

The link protection control 604 enables the selection of the type of link that the two network nodes may employ to interconnect. The "1+1" and "2+0" options may require that multiple IDU IPs to be assigned via the node information database. If there is an insufficient number of IDU IPs in the node information database, then the configuration module 216 may not allow the user to set the site for the link protection. If the user selects "2+0" for the link protection, the configuration module 216 may automatically pre-check the remote site to confirm that enough IDU IPs are available in the node information database. If there is an insufficient number of IDU IPs, the user may update the node information database so that additional IDU IPs are assigned. For example, the link protection options may include: (1) 1+0; (2) 1+1; (3) 1+0 with nodal; (4) 1+1 with nodal; and (5) 2+0 with nodal, in which "1+0" is an option for no link redundancy/link protection. However, the link protection options may include any option up to an "8+0" link in other embodiments.

The number of IDUs that are listed in the IDU number field 606 may be determined automatically by the configuration module 216 via the node information database. Additionally, the configuration module 216 may identify the number of IDU IPs assigned via node information database. The IDU order control 608 may enable a user to select the placement of the new IDU into the site. For example, with respect to nodal installations, "1+1" and "2+0" installations may be restricted to the use of slots 1 and 2, 3, and 4, or 5 and 6 with the constraint that the lower IDU slot is to be an odd number. Once these controls are configured, the ports 1-7 may be enabled and disabled automatically by the configuration module 216.

The polarization control 610 may be automatically populated by the configuration module 216 based on the polarization that was selected via the polarization control 508 of the user interface 500. The element ID control 612 may enable the input of a microwave element ID for the network node. For example, the element ID may include eight characters with the characters "MW." The site ID field 614 may be pre-populated by the configuration module 216. The IP address control 616 may be enable the selection of an IP address. The selection may be made via a drop down menu or another functionally equivalent user interface control. However, for IDUs in nodal slots 3-6, the IP fields (IP, subnet, gateway, etc.) may be greyed out because no IP configurations are required for these slots. Further, the default gateway and subnet mask information may be pre-populated by the configuration module 216. The trap manager controls 516 may enable the user to modify the order of the trap managers.

The transmit frequency and the receive frequency in the frequency fields 620 may be pre-populated by the configuration module 216 based on the frequency input entered into the transmit frequency control 518 of the user interface 500. Accordingly, any changes to the frequency values in the frequency fields 620 may only be performed via the transmit frequency control 518 of the user interface 500.

The port type controls 622 may enable the specification of port type on ports 1 and 2, which may be either optical or electrical, such as a RJ45 port. The port assignment control 624 may enable the setting of ports based on relay link design. For example, ports 1, 2, and 8 are essentially VLAN trunked ports. In most cases, more than one VLAN is to be configured to those ports if the ports are enabled. For the port connecting to a router, only one VLAN may be configured for such a port. For ports 1, 2 and 8, there may be multiple drop down options that correlate to the VLAN options in the VLAN information section 310. The wayside control 626 may be configured according to the type of IDU connection at the remote network node. For example, if the IDU connects to a relay only IDU (i.e., no cellular or router at the remote network node), the wayside control 524 may be configured automatically so that the associated ports are enabled.

The configuration module 216 may generate configuration settings for the remote network node based on the configuration parameters inputted and/or displayed on the user interface 600. In various embodiments, the configuration settings may be in the form of CLI commands. Following the activation of the export file button 628, the script module 218 may generate a configuration file that encapsulates the configuration settings for each IDU at the remote network node.

Example Processes

Figure 7:
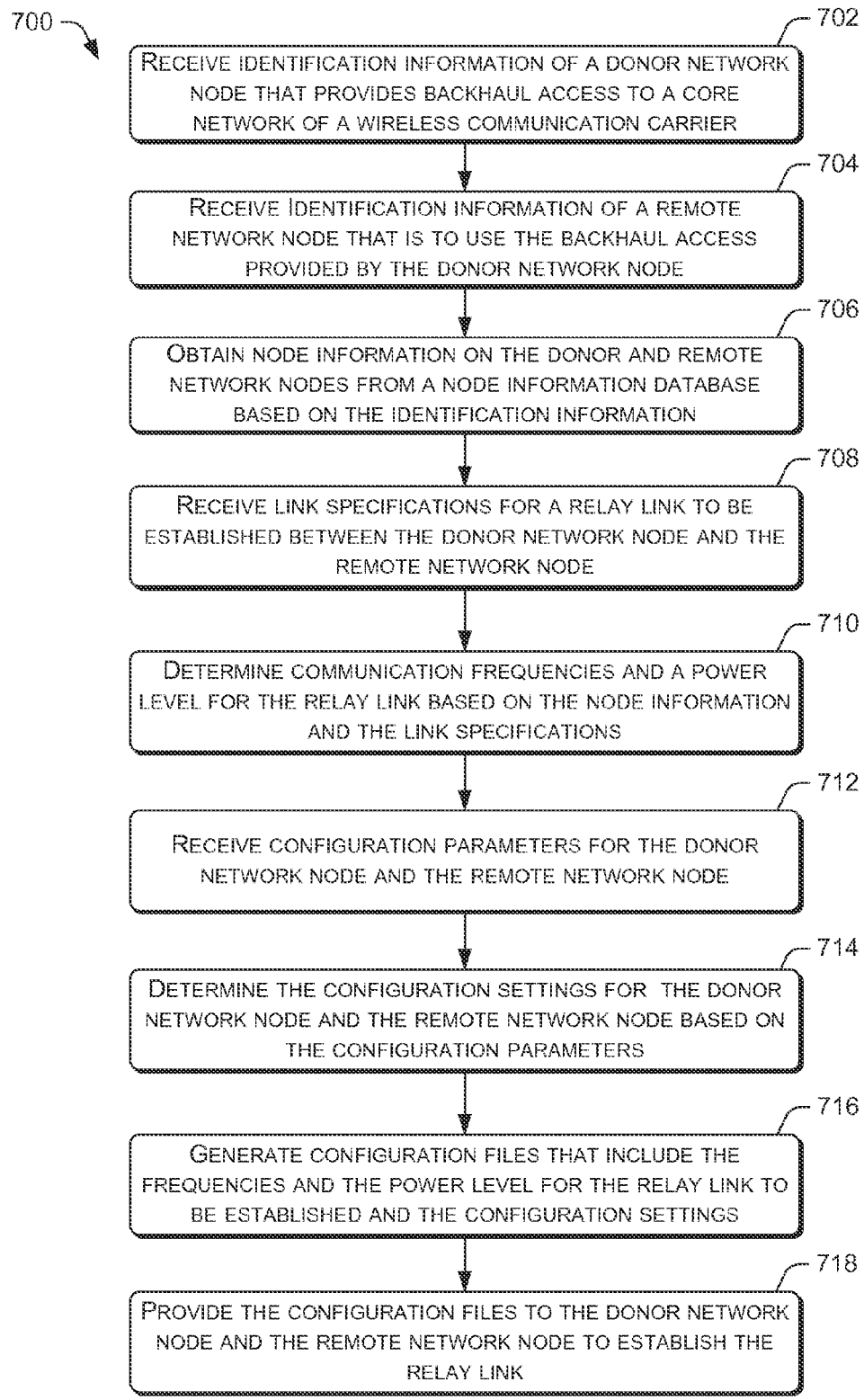
FIG. 7 is a flow diagram of an example process for generating configuration files for a donor network node and a remote network node.
Figure 8:
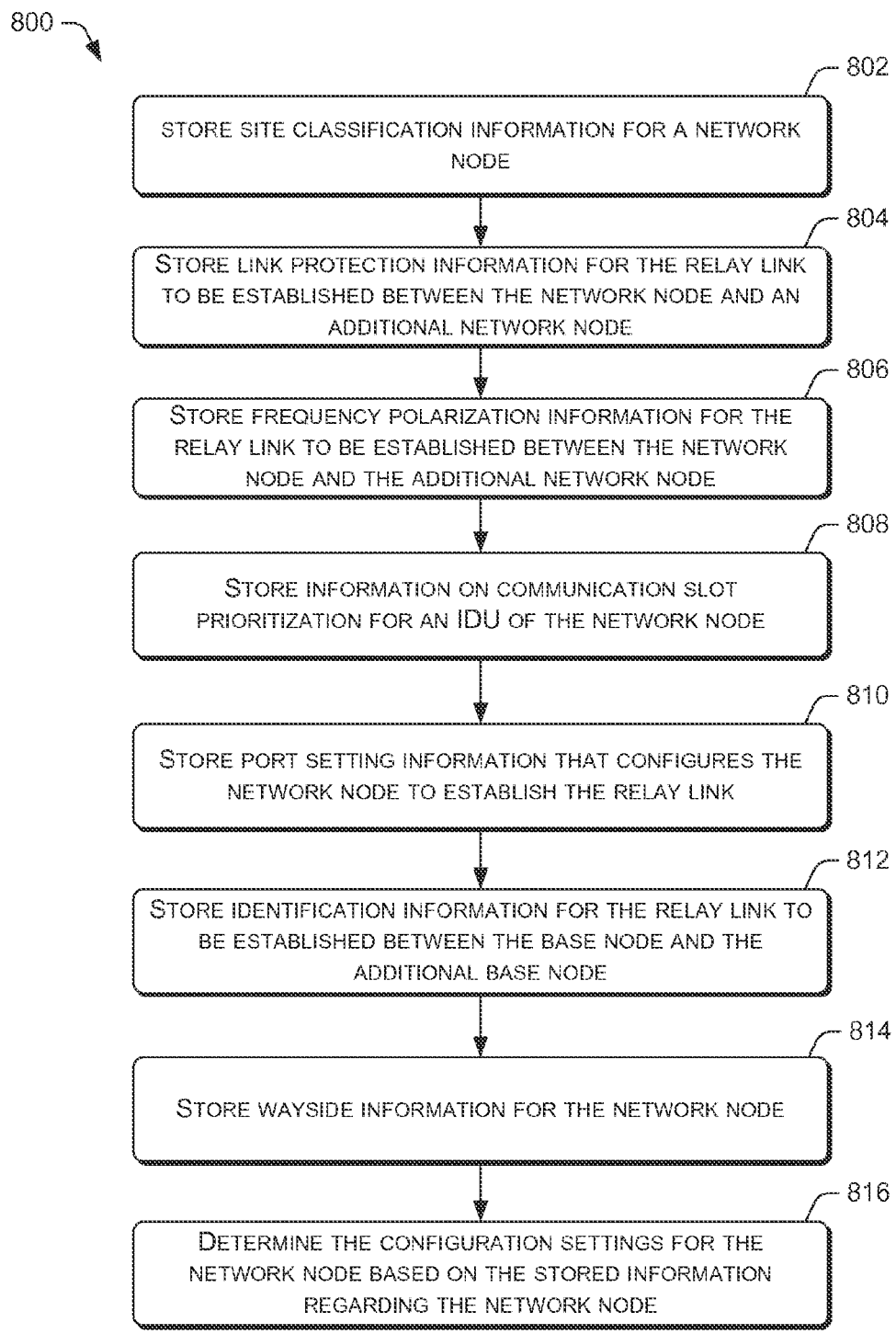
FIG. 8 is a flow diagram of an example process for determining the configuration settings for a network node.

FIGS. 7 and 8 present illustrative processes 700 and 800 for using a network node relay link configuration tool to configure a relay link between two network nodes. Each of the processes 700 and 800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700 and 800 are described with reference to the architecture 100 of FIG. 1.

FIG. 7 is a flow diagram of an example process 700 for generating configuration files for a donor network node and a remote network node. At block 702, the relay link configuration engine 120 may receive identification information of a donor network node that provides backhaul access to a core network of a wireless communication carrier. In various embodiments, the donor network node may be a network node that is closest to an Alternative Access Vendor (AAV) hub site. For example, the donor network node may be a core access service site, a core site, a relay service site, or a relay site.

At block 704, the relay link configuration engine 120 may receive identification information of a remote network node that is to use the backhaul access provided by the donor network node. In various embodiments, the remote network node may use the backhaul access to exchange telecommunication and data communication traffic with the core network. For example, the remote network node may be a recipient site, a relay service site, a relay site, or a DAS site.

At block 706, the relay link configuration engine 120 may obtain node information on the donor network node and the remote network node from a node information database based on the identification information of the nodes. The node information of a network node that is retrieved from the node information database may include network node site information, a network node address, virtual local area network (VLAN) identifier, Internet protocol (IP) address, subnet mask, gateway IP, an IDU count, any other VLAN identifiers, and/or so forth.

At block 708, the relay link configuration engine 120 may receive link specifications for a relay link that is to be established between the donor network node and the remote network node. In various embodiments, the link specifications may include a link frequency band, a MRMC script profile to be applied, ACM mode parameters, a RFU type setting, and a maximum transmission level parameter. The MRMC script profile may be a predetermined RF design option that specifies the allocations of transmission rates and transmission channels for the relay link.

At block 710, the relay link configuration engine 120 may determine communication frequencies and a power level for the relay link based on the node information on the network nodes and the link specification. The communication frequencies may include a transmit frequency and a receive frequency. The transmit frequency and the receive frequency may be paired together according to FCC rules. Further, the power level may be defined based on the RF band, ODU type, and modulations for the relay link.

At block 712, the relay link configuration engine 120 may receive configuration parameters for the donor network node and the remote network node. In various embodiments, the configuration parameters may include site classification information for the network nodes, link protection information for the relay link, frequency polarization information, communication slot prioritization information, port setting information, relay link identification information, wayside information, and/or so forth. The configuration parameters may include parameters that are inputted by a user and/or parameters that are automatically pre-populated by the relay link configuration engine 120 based on previously received configuration settings.

At block 714, the relay link configuration engine 120 may determine the configuration settings for the donor network node and the remote network node based on the configuration parameters. In various embodiments, the relay link configuration engine 120 may perform the determination by processing the configuration parameters via logical statements, data arrays, lookup tables, validation routines, and/or other application code. In some embodiments, the configuration settings as generated by the relay link configuration engine 120 may include CLI commands. The configuration settings for a network node may be generated for the IDU of the network node when the network node is a split mount network node. Alternatively, the configuration settings for the network node may be generated for the ODU of the network node when the network node is an all-outdoor network node.

At block 716, the relay link configuration engine 120 may generate configuration files for the donor network node and the recipient network node. Each of the configuration files may include the communication frequencies and the power level for the relay link to be established, as well as the configuration settings for the IDU or the ODU of a network node.

At block 718, the relay link configuration engine 120 may provide the configuration files to the donor network node and the remote network node. In turn, the IDU or the ODU at each of the donor network node and the remote network node may implement the configuration files to establish the relay link.

FIG. 8 is a flow diagram of an example process 800 for determining the configuration settings for a network node. The process 800 may further illustrate block 714 of the process 700. At block 802, the relay link configuration engine 120 may store site classification information for a network node. In various embodiments, the network node may be a donor network node or a remote network node. Accordingly, for a donor network node, the site classification may include a core access service site, a core site, a relay service site, or a relay site. For a remote network node, the site classification may include a recipient site, a relay service site, a relay site, or a DAS site.

At block 804, the relay link configuration engine 120 may store link protection information for the relay link to be established between the network node and the additional network node. Link protection refers to providing a radio link with redundancy, such that the failure of one radio component does not cause the failure of the radio link. In various embodiments, the link protection setting for the relay link may include: (1) 1+0; (2) 1+1; (3) 1+0 with nodal; (4) 1+1 with nodal; or (5) 2+0 with nodal.

At block 806, the relay link configuration engine 120 may store the frequency polarization information for the relay link that is to be established between the network node and the additional network node. For example, a 2+0 link using "H/V" equates to a non-XPIC link, with the lower slotted IDU using horizontal polarization and the upper slotted IDU using vertical polarization.

At block 808, the relay link configuration engine 120 may store information on the communication slot prioritization for an IDU of the network node. For example, with respect to nodal installations at the network node, "1+1" and "2+0" installations may be restricted to the use of slots 1 and 2, 3, and 4, or 5 and 6 with the constraint that the lower IDU slot is to be an odd number.

At block 810, the relay link configuration engine 120 may store port setting information that configures the network node to establish the relay link. For example, ports may be set as either optical or electrical. Further, ports 1, 2, and 8 may be VLAN trunked ports. In most cases, more than one VLAN is to be configured to those ports if the ports are enabled. For the port connecting to a router, only one VLAN may be configured for such a port. For ports 1, 2 and 8, there may be multiple drop down options.

At 812, the relay link configuration engine 120 may store the identification information for the relay link to be established between the network node and the additional network node. In various embodiments, the identification information may include one or more identifiers that uniquely identifies the relay link. For example, each of the identifiers may be in the format of an eight character string.

At block 814, the relay link configuration engine 120 may store the wayside (in-band management) information for the network node. Wayside may be configured according to the type of IDU connection at the remote network node. For example, if the IDU connects to a relay only IDU (i.e., no cellular or router at the remote network node), wayside may be configured automatically so that the associated ports are enabled. At block 816, the relay link configuration engine 120 may determine the configuration settings for the network node based on the stored information regarding the network node. In various embodiments, the configuration settings may be determined for the IDU or the ODU of the network node.

The implementation of the relay configuration tool may lead to the rapid deployment of relay links between donor network nodes and remote network nodes. Such rapid deployment may lead to faster wireless communication network expansion to geographical locations that are previously unserved or underserved by a wireless telecommunication carrier. As such, the implementation of the relay configuration tool may help to decrease in the amount of network coverage problems that are experienced by subscribers, as well as reduce the number of calls to customer care of the wireless telecommunication carrier. The implementation of the relay configuration tool may also reduce the labor cost associated with the expansion or improvement of the wireless telecommunication network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving identification information of a donor network node that provides backhaul access to a core network of a wireless communication carrier;
   receiving identification information of a remote network node that is to use the backhaul access provided by the donor network node;
   obtaining node information on the donor network node and the remote network node from a node information database based at least on the identification information of the donor network node and the remote network node, the node information for a network node including at least one of network node site information, a network node address, a virtual local area network (VLAN) identifier, Internet protocol (IP) address, a subnet mask, a gateway IP, an indoor unit (IDU) count, or any other VLAN identifiers;
   receiving link specifications for a relay link to be established between the donor network node and the remote network node; and
   determining communication frequencies and a power level for the relay link based at least on the node information and the link specifications.

2. The one or more non-transitory computer-readable media of claim 1, wherein the acts further comprise:
   receiving configuration parameters for the donor network node and the remote network node, the configuration parameters including site classification information for the network nodes, link protection information for the relay link, frequency polarization information, communication slot prioritization information, port setting information, relay link identification information, and wayside information for indoor units or outdoor units of each network node;
   determining configuration settings for the indoor units or the outdoor units of the donor network node and the remote network node based at least on the configuration parameters; and
   generating configuration files that includes information on the communication frequencies and power level for the relay link and the configuration settings for the indoor units or the outdoor units of the donor network node and the remote network node.

3. The one or more non-transitory computer-readable media of claim 2, wherein acts further comprise providing the configuration files to the indoor units or the outdoor units of the donor network node and the remote network node to implement the relay link.

4. The one or more non-transitory computer-readable media of claim 2, wherein the configuration files provide at least one of command line interface (CLI) scripts, simple network management protocol (SNMP) put statements, or additional programming inputs that are implemented by an indoor unit or an outdoor unit of the remote network node via orchestration, the orchestration being performed via one of ConfD, Tail-F, or network configuration protocol (NETCONF).

5. The one or more non-transitory computer-readable media of claim 2, wherein the site classification information classifies the donor network node as one of multiple sites, the multiple sites including a core access service site, a core site, a relay service site, or a relay site, and classifies the remote network node as one of a recipient site, a relay service site, a relay site, and a distributed antenna system (DAS) site.

6. The one or more non-transitory computer-readable media of claim 2, wherein the link protection information specifies the relay link as less than an "8+8" link, in which the relay link is one of a "1+0" link, a "1+1" link, a "2+0" link, a "2+2" link, a "4+0" link, "4+4" link, or a "8+0" link with or without a nodal.

7. The one or more non-transitory computer-readable media of claim 2, wherein the donor network node is a network node that is directly connected to the core network via a wired backhaul or an intermediate network node that is one or more network node links away from the network node with the wired backhaul to the core network.

8. The one or more non-transitory computer-readable media of claim 2, wherein the determining includes determining configuration settings for an intermediate network node that automates an end-to-end communication path for the remote network node and the core network, the configuration settings including an update to a routing table, an update to a VLAN database, and one or more port updates.

9. The one or more non-transitory computer-readable media of claim 8, wherein the one or more port updates include at least one of an update to a port speed setting, an update to a port duplex setting, an update to a port auto-negotiation setting, and an update to a port description.

10. The one or more non-transitory computer-readable media of claim 1, wherein the link specifications include at least one of a link frequency band, a multi-rate multi-channel (MRMC) script profile to be applied, adaptive coding and modulation (ACM) mode parameters, a radio frequency unit (RFU), or a maximum transmission level parameter.

11. The one or more non-transitory computer-readable media of claim 6, wherein a MRMC script profile includes a predetermined design option that specifies allocations of transmission rates and transmission channels for the relay link.

12. The one or more non-transitory computer-readable media of claim 1, wherein the relay link is a microwave relay link.

13. The one or more non-transitory computer-readable media of claim 1, wherein the communication frequencies include a transmit frequency and a receive frequency that are paired according to Federal Communication Commission (FCC) rules.

14. The one or more non-transitory computer-readable media of claim 1, wherein the power level is determined based at least on a communication frequency of the relay link and a type of quadrature amplitude modulation (QAM) for the relay link.

15. A system, comprising:
one or more processors; and
memory including a plurality of computer-executable components that are executable by the one or more processors to perform a plurality of actions, the plurality of actions comprising:
receiving identification information of a donor network node that provides backhaul access to a core network of a wireless communication carrier;
receiving identification information of a remote network node that is to use the backhaul access provided by the donor network node;
obtaining node information on the donor network node and the remote network node from a node information database based at least on the identification information of the donor network node and the remote network node;
receiving link specifications for a relay link to be established between the donor network node and the remote network node;
determining communication frequencies and a power level for the relay link based at least on the node information and the link specifications;
receiving configuration parameters for the donor network node and the remote network node;
determining configuration settings for indoor units or outdoor units of the donor network node and the remote network node based at least on the configuration parameters; and
generating configuration files that includes information on the communication frequencies and power level for the relay link and the configuration settings for the indoor units or the outdoor units of the donor network node and the remote network node.

16. The system of claim 15, wherein the plurality of actions further comprise providing the configuration files to the indoor units or the outdoor units of the donor network node and the remote network node to implement the relay link.

17. The system of claim 15, wherein the node information for a network node including at least one of network node site information, a network node address, a virtual local area network (VLAN) identifier, Internet protocol (IP) address, a subnet mask, a gateway IP, an indoor unit (IDU) count, or any other VLAN identifiers.

18. The system of claim 15, wherein the link specifications include at least one of a link frequency band, a multi-rate multi-channel (MRMC) script profile to be applied, adaptive coding and modulation (ACM) mode parameters, a radio frequency unit (RFU), or a maximum transmission level parameter.

19. The system of claim 15, wherein the configuration parameters including site classification information for the network nodes, link protection information for the relay link, frequency polarization information, communication slot prioritization information, port setting information, relay link identification information, and wayside information for the indoor units or the outdoor units of each network node.

20. The system of claim 19, wherein the site classification information classifies the donor network node as one of multiple sites, the multiple sites including a core access service site, a core site, a relay service site, or a relay site, and classifies the remote network node as one of a recipient site, a relay service site, a relay site, or a distributed antenna system (DAS) site.

21. The system of claim 19, wherein the link protection information specifies the relay link as less than a "8+8" link, in which the relay link is one of a "1+0" link, a "1+1" link, a "2+0" link, a "2+2" link, a "4+0" link, "4+4" link, or a "8+0" link with or without a nodal.

22. A computer-implemented method, comprising:
receiving identification information of a donor network node that provides backhaul access to a core network of a wireless communication carrier;
receiving identification information of a remote network node that is to use the backhaul access provided by the donor network node;
obtaining node information on the donor network node and the remote network node from a node information database based at least on the identification information of the donor network node and the remote network node, the node information for a network node including at least one of network node site information, a network node address, a virtual local area network (VLAN) identifier, Internet protocol (IP) address, a subnet mask, a gateway IP, an indoor unit (IDU) count, or any other VLAN identifiers;
receiving link specifications for a relay link to be established between the donor network node and the remote network node;
determining communication frequencies and a power level for the relay link based at least on the node information and the link specifications;
receiving configuration parameters for the donor network node and the remote network node, the configuration parameters including site classification information for the network nodes, link protection information for the relay link, frequency polarization information, communication slot prioritization information, port setting information, relay link identification information, and wayside information for indoor units or outdoor units of each network node;
determining configuration settings for the indoor units or the outdoor units of the donor network node and the remote network node based at least on the configuration parameters; and
generating configuration files that includes information on the communication frequencies and power level for the relay link and the configuration settings for the indoor units or the outdoor units of the donor network node and the remote network node.

23. The computer-implemented method of claim 22, wherein the communication frequencies include a transmit frequency and a receive frequency that are paired according to Federal Communication Commission (FCC) rules.

24. The computer-implemented method of claim 22, wherein the power level is determined based at least on a communication frequency of the relay link and a type of quadrature amplitude modulation (QAM) for the relay link.

* * * * *